UNITED STATES PATENT OFFICE.

MARREL V. NENCKI, OF BERNE, SWITZERLAND, AND RICHARD SEIFERT, OF DRESDEN, SAXONY, GERMANY, ASSIGNORS TO DR. F. VON HEYDEN, NACHFOLGER, OF RADEBEUL, DRESDEN, GERMANY.

PRODUCTION OF SALOL.

SPECIFICATION forming part of Letters Patent No. 350,012, dated September 28, 1886.

Application filed July 22, 1886. Serial No. 208,761. (Specimens.)

*To all whom it may concern:*

Be it known that we, MARREL VON NENCKI, a citizen of the Russian Empire, residing at Berne, Switzerland, and RICHARD SEIFERT, a citizen of the German Empire, residing at Dresden, in the Kingdom of Saxony, and German Empire, have invented new and useful Improvements in the Production of Salol, of which the following is a specification.

The term "salol" we apply to a compound produced by the action of oxychloride of phosphorus upon a mixture of salicylic acid and a phenol.

In carrying out our invention we take two molecules of salicylic acid, add thereto two molecules of phenol, heat the mixture to 120° centigrade, and then introduce into the molten mass little by little one molecule of oxychloride of phosphorus. A vivid reaction takes place, hydrochloric acid passes off, and a salicylate of phenol is formed, together with metaphosphoric acid, as indicated by the following equation:

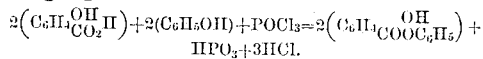

This formula shows that metaphosphoric acid is set free, which, with part of the phenol, forms a phosphoric acid phenyl ester, thereby reducing the yield of salicylate of phenol. This disadvantage can be avoided by employing, in place of free salicylic acid, salicylate of sodium or other metallic salicylates, as indicated by the following formula:

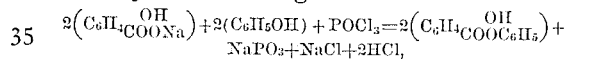

and if in place of free salicylic acid and free phenol the sodium compounds of these two substances are employed, the reaction is such as indicated in the following fomula:

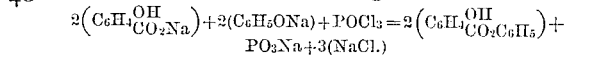

The salicylate of phenol obtained by either of the above-named reactions is separated from the melt by the addition of water. It is then washed with carbonate of soda and finally treated with alcohol, ether, benzole, or another suitable solvent for recrystallization. By elementary analysis the composition of the salol is found to correspond to the formula $C_6H_4{}^{OH}_{COOC_6H_5}$. The salol crystallizes in well-developed rhombic prisms, the melting-point of which is at 43° centigrade. The crystals are colorless and insoluble in water, but they are easily soluble in alcohol, ether, benzole, ligroin, olive-oil, oil of almonds, and glacial acetic acid. By acids or carbonates of alkalies the salol is not changed, but by the action of caustic alkalies it is decomposed into salicylic acid and phenol. The same decomposition takes place by the pancreatic juice. If salicylate of phenol is introduced into the organism, it is decomposed in the small intestines while absorbing one molecule of water into its component parts which are absorbed and passed off in the urine, the salicylic acid in the form of salicyluric acid $= C_6H_4{}^{OH}_{CO}-$ $NH-CH_2-CO_2H$ and the phenol in the form of sulphuric acid phenol ester. The salol is an antiseptic like salicylic acid.

In preparing the salol different phenols may be employed—such, for instance, as resorcin, the two naphthols, and dioxynaphthaline, and we have prepared salol from all the phenols above named. The characteristics remain the same in all cases.

In view of the fact that salol is insoluble in water and is not decomposed before it reaches the small intestines, it does not irritate the coats of the stomach; but since the decomposition goes on as the salol passes through the entire length of the intestines the salicylic acid and the phenol act locally upon the tunis of the intestines. The salol can therefore be used with success as remedy for microbiotic or other parasitic diseases of the intestines, and it also renders it feasible to introduce into the organism salicylic acid without producing a bad taste or trouble to the stomach.

What we claim as new, and desire to secure by Letters Patent, is—

1. As a new product, the compound ether herein described, produced by the action of oxychloride of phosphorus upon a mixture of salicylic acid and a phenol, and which is insoluble in water, and is decomposed by caustic alkalies and also by the pancreatic juice into its component parts.

2. The within-described process of producing the compound ether, which consists in mixing together two molecules of salicylate of soda with two molecules of phenol, heating the mixture to about 120° centigrade, adding to the heated mass one molecule of oxychloride of phosphorus, and finally separating the salol from the melt and washing the same, substantially as set forth.

In testimony whereof we have hereunto set our hands and seals in the presence of two subscribing witnesses.

MARREL V. NENCKI. [L. S.]
RICHARD SEIFERT. [L. S.]

Witnesses as to signature of M. von Nencki:
JAKOB ROHRER,
Dr. A. ONIKEN.

Witnesses as to signature of R. Seifert:
ALFRED DREKER,
RICHARD EDLICH.

It is hereby certified that the name of one of the patentees in Letters Patent No. 350,012, granted September 28, 1886, for an improvement in "The Production of Salol," was erroneously written and printed "Marrel V. Nencki," whereas said name should have been written and printed *Marcel V. Nencki;* and that said Letters Patent should be read with this correction therein that the same may conform to the record of the case in the Patent Office.

Signed, countersigned, and sealed this 5th day of October, A. D. 1886.

[SEAL.]
                                                      H. L. MULDROW,
*Acting Secretary of the Interior.*

Countersigned:

R. B. VANCE,
        *Acting Commissioner of Patents.*